May 31, 1949.                    H. E. PAGE                    2,471,649
                         TOASTER-TRAY COMBINATION
Filed Sept. 10, 1946                                        2 Sheets-Sheet 1
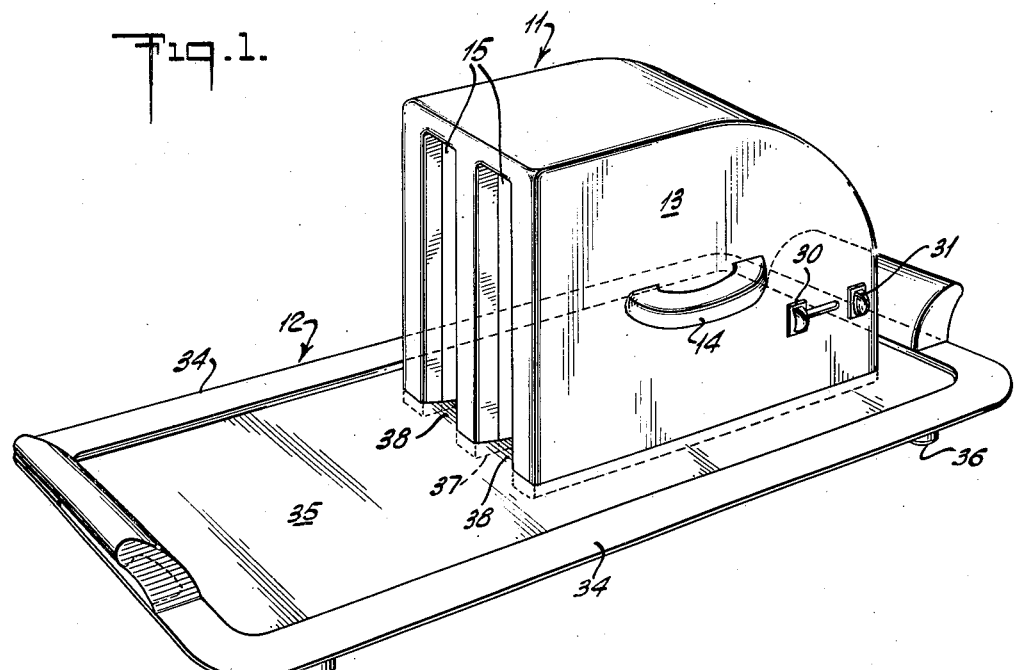
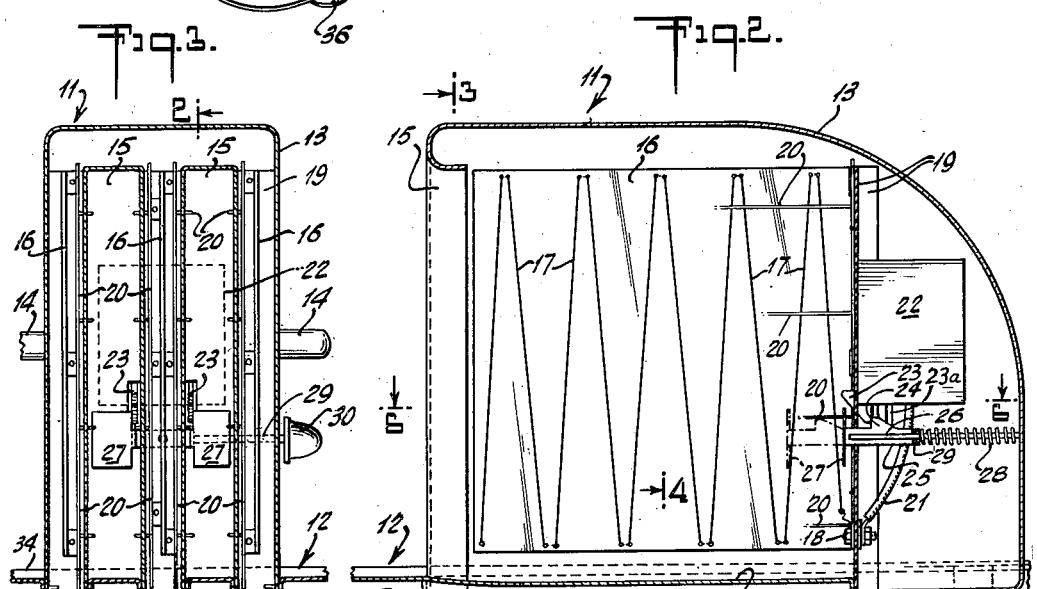
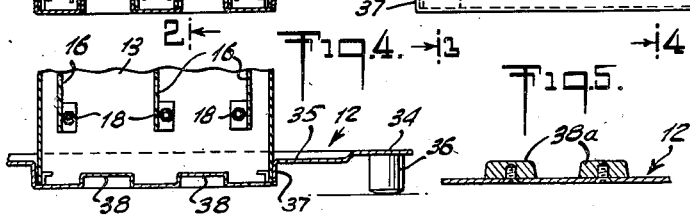
INVENTOR
HERBERT E. PAGE.
BY
ATTORNEY May 31, 1949. H. E. PAGE 2,471,649
TOASTER-TRAY COMBINATION
Filed Sept. 10, 1946 2 Sheets-Sheet 2
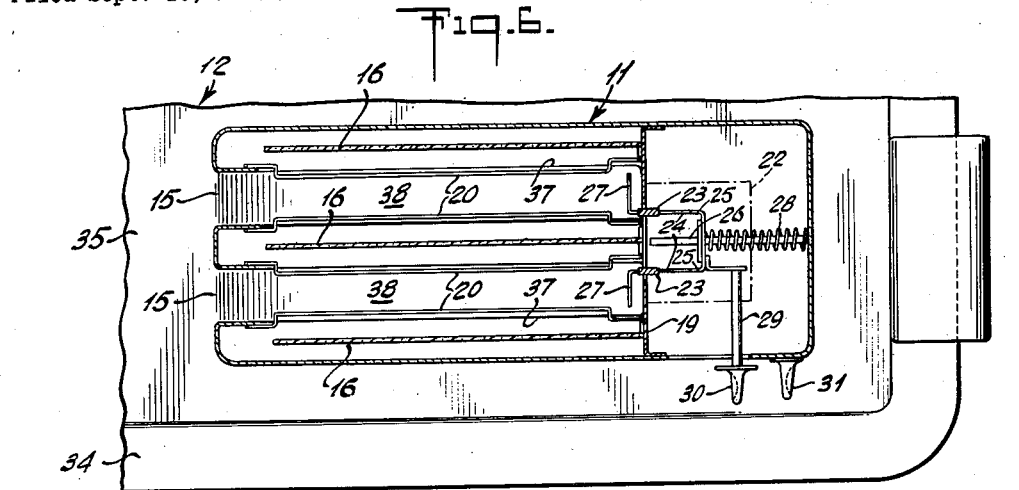
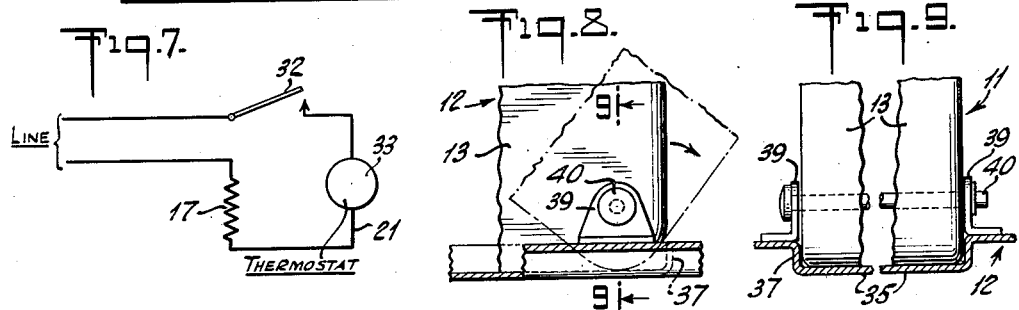
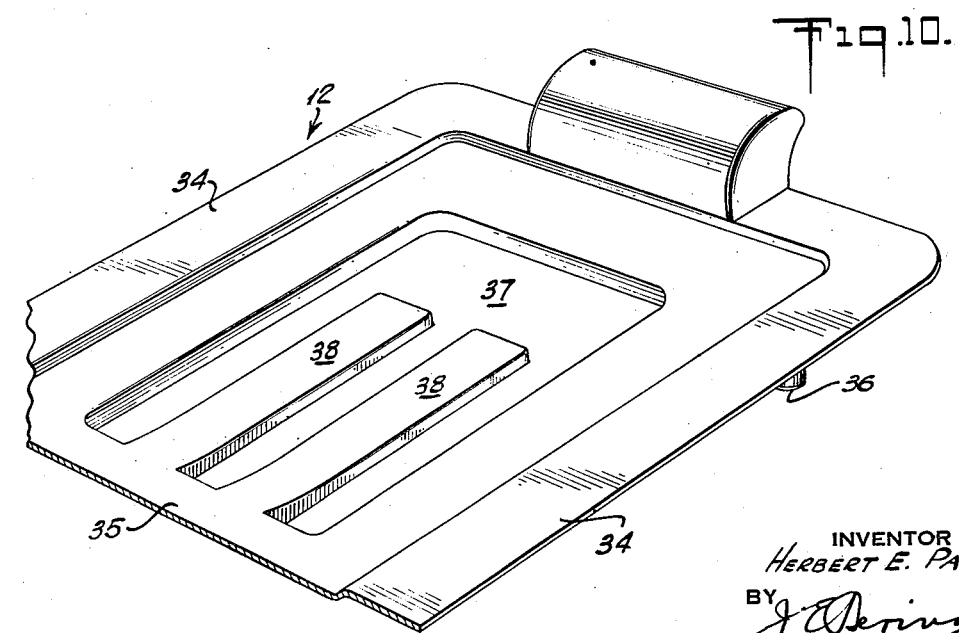
INVENTOR
HERBERT E. PAGE.
BY
ATTORNEY Patented May 31, 1949

2,471,649

UNITED STATES PATENT OFFICE 2,471,649

TOASTER-TRAY COMBINATION

Herbert E. Page, Oakwood, Ohio

Application September 10, 1946, Serial No. 695,908

1 Claim. (Cl. 99—401)

This invention relates to toaster-tray combinations, and more particularly to an electric toaster unit and a supporting tray unit respectively constructed and arranged for novel cooperation in the toasting of bread or other articles.

That element of the combination represented by the toaster unit is of the class shown in applicant's pending application S. N. 559,028, filed October 17, 1944, for Electric toaster. Thus it is characterized by toasting compartments which open through the front of the unit for the reception and withdrawal of the articles to be toasted, and further open through the bottom of the unit in order that crumbs may drop freely from the toaster rather than collect therein. When in use such a toaster customarily is mounted on a tray.

In accordance with the present invention, a further functional relationship between the toaster and tray is contemplated in that the openings in the bottom of the toaster are utilized to receive ribs on the tray, which ribs act as slideways for the articles to be toasted and additionally project the articles upward into proper relationship with the electrical heating element.

To obtain and effect such functional relationship in a toaster-tray combination accordingly is an object of the invention.

Another object of the invention is to extend the novel cooperation between the toaster and tray unit to include locating means on the tray whereby the toaster, which is removable from the tray, may be placed thereon invariably in the proper position relative to the slideways without the exercise of special care.

A further object is to obtain a toaster-tray combination of practical and attractive design which retains the feature of simplified cleaning which is a part of the device of application S. N. 559,028 and which adds thereto structure of new and improved function and performance.

Other objects and structural details of the invention will appear from the following description, when read in connection with the accompanying drawings, wherein:

Fig. 1 is a view, in perspective, of the illustrated embodiment of the present toaster-tray combination;

Fig. 2 is a view of the toaster-tray combination in vertical longitudinal section, a fragment only of the tray being shown;

Fig. 3 is a view in cross-section, taken substantially along the line 3—3 of Fig. 2;

Fig. 4 is a fragmentary view, in cross-section, taken substantially along the line 4—4 of Fig. 2;

Fig. 5 is a detail view, showing an alternative form of elevated slideway;

Fig. 6 is a view in horizontal longitudinal section, taken substantially along the line 6—6 of Fig. 2.

Fig. 7 is a wiring diagram;

Figs. 8 and 9 are detail views, showing an alternative mounting of the toaster, including a hinge; and Fig. 10 is a fragmentary view, in perspective of the tray unit.

Referring to Fig. 1 a toaster unit is indicated at 11 resting on a tray unit 12. The toaster unit comprises a housing 13 which may, as shown, be of one piece sheet metal construction. The housing 13 is generally rectangular in shape, although it may be given a curvature of any preferred design. The top, rear and side portions of the housing present closed surfaces, from which project handles 14 and the toaster operating controls. At the front and bottom portions of the housing 13 one or more openings are provided, the metal of the housing being turned inward to define such openings which constitute slots for receiving the articles to be toasted and for cooperation with the tray, as will be later described. Corresponding openings in the front and bottom portions intersect one another so as to define a single compartment 15 opening through the front and bottom portions of the toaster.

In part defining the internal walls of the compartments 15 are mica or isinglass supports 16 (Figs. 2, 3 and 6) through which heating elements 17 are threaded or otherwise carried. The heating elements 17 are connected to respective terminals 18 carried by a transverse plate 19 at the rear of housing 13, which plate also mounts the supports 16. The terminals 18 are interconnected, and form part of an electrical circuit including a lead 21 extending from a switch and thermostatic unit 22 mounted on plate 19. A suitable lead, not shown, enters unit 22 at its one end and is adapted at its other end for connection with a source of electric power. Unit 22 controls a latch 23 arranged in cooperative relation with teeth 24 on an arm 25. There are two arms 25 joined in a U-shaped assembly (see Fig. 6) mounted on a plunger 26, each arm extending into a respective compartment 15. On the outer end of each arm 25 is a pusher element 27 in position to expel from the compartment 15 the article to be toasted, a spring 28 surrounding the plunger 26 providing the motive force of expulsion. Secured to the U-shaped assembly comprising arms 25 is a lever 29, which extends through an opening in the side of housing 13 and has mounted thereon a finger piece 30. Through operation of the lever 29 by finger piece 30 the arms 25 may be retracted against the urging of spring 28 to the position shown in Fig. 2 where they are held by engagement of the latch 23 with one of the teeth 24. There is further provided, outside the housing 13, a rotatable finger piece 31 for regulating the thermostat in unit 22 in a manner not here shown.

In accordance with the well-known operation of devices of this class, it will be understood that retraction of the arms 25 causes latch 23 to engage with a tooth 24, and further causes a switch operating plunger 23a to be cammed upward whereby to operate a switch in unit 22 to close the electrical circuit and energize heating elements 17. Further, in response to the passage of time and rise in temperature, all as determined by the setting of the thermostat, latch 23 automatically is disengaged to permit arms 25 to move forward and expel from compartments 15 the articles inserted therein. The electrical circuit is shown diagrammatically in Fig. 7 where the described switch is indicated at 32 and the thermostat at 33.

As a guide for the article to be toasted and to prevent contact thereof with the heating elements 17, a grid 20 is arranged on each side of each slot 15, the grid being comprised of spaced wires, attached at their opposite ends to the turned over ends of housing 13 and at the back plate 19.

It will further be appreciated that the electrical controls per se form no part of the present invention and that any conventional type of controls may be utilized. Insofar as the present invention is concerned, in fact, the toaster unit may be non-automatic in action. Moreover, it is a feature of the present invention that such controls, and the external operating means therefor, may be arranged and disposed wherever most desired for convenience and appearance, for example on the top of the housing 13 where they are readily accessible to the eye and hand.

Turning now to a consideration of the tray unit and its manner of cooperation with the toaster unit, the tray may assume generally any desired shape and design. Thus, it may comprise, as shown, a peripheral ledge 34 surrounding a central base portion 35, the whole being supported on feet 36.

In accordance with the present invention, however, and as shown in Fig. 10, the tray unit further includes a depression 37 in base portion 35, the depression 37 being of a size and design to receive the bottom of toaster housing 13 and to inhibit endwise and lateral motions of the toaster unit. Within the depression 37 and extending longitudinally of the tray 12 are one or more upwardly extruded ribs 38, the number of such ribs being dependent upon the number of compartments 15 in the toaster unit. The ribs 38 preferably have a heighth slightly less than the depth of the depression 37 in order that the depression may properly function as the locating means for the toaster unit. At their front ends the ribs 38 incline gradually to meet the upper surface of base 35 at the front of depression 37. At their opposite ends, the ribs 38 terminate short of the corresponding end of depression 37 in order that the closed back end of the toaster may be accommodated. When the toaster unit is placed into the depression 37 the extruded ribs 38 enter and are embraced by the bottom portions of compartments 15. The ribs accordingly become slideways for the articles to be toasted and project such articles upward so that they may be exposed throughout their full area to the action of the heating elements 17.

As illustrated, the ribs 38 serve as slideways both for insertion and withdrawal of the articles to be toasted. They may be used for withdrawal only should it be desired to open the compartments 15 through the top of the housing 13 to make possible the more conventional gravity type of insertion.

While, as shown, the slideways 38 are extruded portions of the tray, they may, as shown in Fig. 5, be separately constructed as elements 38a and be attached to the toaster by screws, rivets, or the like. In either embodiment insulating material may be used. In both forms such material could be fastened as a cover over the slideways, while in the form of Fig. 5 the elements 38a could themselves be made of an insulating material.

Further, while the embodiment of Fig. 1 contemplates that the toaster unit shall have no positive connection with the tray unit, it is possible that a hinged connection between the units may be used. Such a hinge is shown in Figs. 8 and 9 as comprising a bracket 39 fixed to the tray 12 and carrying a pin 40 extending into the rear of the toaster housing 13. The use of a hinge may be preferred in some instances, for example in a commercial installation wherein several toasting compartments 15 are provided and the toasting unit accordingly it not easily lifted from the tray for cleaning purposes. With regard to the feature of cleaning, it will be perceived that the present invention does not depart from or modify the novel construction contemplated by the prior patent application above referred to. No opportunity is given for crumbs or other material from the toasted articles to collect within the toaster. All such matter drops to the tray, and may be readily removed either by lifting the toaster unit bodily from the tray, or raising it upon the hinge.

What is claimed is:

In a toasting device, the combination of a toaster element comprising a casing having horizontally spaced sides defining therebetween a toasting compartment having unobstructed openings at its front and bottom, a heat element carried by each side, and a base for supporting the casing, the base having a top surface of substantially greater length than the length of the casing interrupted at and adjacent one end by a pair of horizontally spaced parallel recesses shaped to receive the lower edge portions of the sides of the casing and by an intervening plane surface disposed to project into and form a bottom for the compartment, whereby to support a slice of toast in the compartment and to provide a slideway for said toast, and pusher means in the rear end of the compartment operable to slide the toast along the slideway out of the compartment through the front opening onto that portion of the top surface of the base in front of the casing; said casing being movable relative to the base whereby to provide free access to the compartment through said openings for cleaning purposes.

HERBERT E. PAGE.

(References on following page)

REFERENCES CITED

The following references are of record in the file of this patent:

UNITED STATES PATENTS

| Number | Name | Date |
|---|---|---|
| 1,532,104 | Lamb et al. | Mar. 31, 1925 |
| 1,543,362 | Boletino | June 23, 1925 |
| 1,556,288 | Ledig | Oct. 6, 1925 |
| 1,746,698 | Caler | Feb. 11, 1930 |
| 1,820,885 | Le Vine | Aug. 25, 1931 |
| 1,954,895 | Shenton | Apr. 17, 1934 |

FOREIGN PATENTS

| Number | Country | Date |
|---|---|---|
| 21,535 | Great Britain | 1903 |